(12) United States Patent
Rajan et al.

(10) Patent No.: US 7,127,003 B2
(45) Date of Patent: Oct. 24, 2006

(54) METHOD AND APPARATUS FOR COMMUNICATING INFORMATION USING DIFFERENT SIGNALING TYPES

(75) Inventors: Suresh Rajan, San Jose, CA (US); Scott C. Best, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 551 days.

(21) Appl. No.: 10/253,312

(22) Filed: Sep. 23, 2002

(65) Prior Publication Data

US 2004/0057525 A1   Mar. 25, 2004

(51) Int. Cl.
*H04L 25/34* (2006.01)
*H03B 1/00* (2006.01)

(52) U.S. Cl. ..................... 375/286; 341/143
(58) Field of Classification Search ............... 341/143; 370/284; 375/286, 287, 288, 257; 326/82, 326/21, 86; 710/63, 66, 305, 307, 313
See application file for complete search history.

(56) References Cited

U.S. PATENT DOCUMENTS

| | | | | |
|---|---|---|---|---|
| 5,818,261 | A * | 10/1998 | Perner | 326/86 |
| 6,243,776 | B1 * | 6/2001 | Lattimore et al. | 710/104 |
| 6,294,933 | B1 * | 9/2001 | Chun et al. | 326/86 |
| 6,295,323 | B1 * | 9/2001 | Gabara | 375/257 |
| 6,323,699 | B1 * | 11/2001 | Quiet | 327/108 |
| 6,346,832 | B1 * | 2/2002 | Young | 327/108 |
| 6,573,760 | B1 * | 6/2003 | Gabara | 327/65 |
| 6,701,280 | B1 * | 3/2004 | Horne et al. | 702/177 |
| 6,703,866 | B1 * | 3/2004 | Arimilli et al. | 326/86 |
| 6,742,063 | B1 * | 5/2004 | Hellum et al. | 710/66 |
| 6,845,460 | B1 * | 1/2005 | Lee et al. | 713/401 |
| 2004/0100309 | A1 * | 5/2004 | Best et al. | 327/65 |

* cited by examiner

*Primary Examiner*—Rehana Perveen
*Assistant Examiner*—Clifford Knoll
(74) *Attorney, Agent, or Firm*—Vierra Magen Marcus & DeNiro LLP

(57) ABSTRACT

Systems, methods, apparatuses, and arrangements enable information to be communicated across a link using different types of signaling. For example, a first type of information is communicated across a bus using a first type of signaling while a second type of information is communicated across the bus using a second type of signaling. By way of example but not limitation, in certain implementation(s) a system including a transmitting unit and a receiving unit are connected by a multi-line bus. The transmitting unit transmits data signals over the multi-line bus using differential signaling and transmits control signals over the multi-line bus using single-ended signaling. The receiving unit interprets signals received in a differential signaling format via the multi-line bus as data signals and interprets signals received in a single-ended signaling format via the multi-line bus as control signals.

79 Claims, 8 Drawing Sheets

METHOD AND APPARATUS FOR COMMUNICATING INFORMATION USING DIFFERENT SIGNALING TYPES

TECHNICAL FIELD

This disclosure relates in general to the field of communicating information over a bus, and in particular, by way of example but not limitation, to communicating different information types using different signaling types over a bus that has two or more lines.

BACKGROUND

Electronic devices such as televisions, camcorders, personal digital assistants (PDAs), mobile telephones, computers, etc. play increasingly important roles in our work, family, and recreational lives. These electronic devices are constructed using solid-state components, including multiple integrated circuits (ICs). Each IC typically includes logic elements such as operational elements, memory elements, etc. that are used to internally process data and perform other tasks/functions. Usually, logic elements for each IC are formed on a "die" of silicon or other semiconductor material. The IC is then surrounded by plastic or a similar material to create an IC package. Extending from the IC die through the IC packaging are input/output (I/O) pins that enable communication between the logic elements of the IC and the external world. Multiple ICs that work together in an electronic device are interconnected using one or more busses to which the I/O pins of individual ICs are connected.

Generally, the greater the number and types of features that are provided by an IC, the more I/O pins that are required for providing such features at any given throughput. In other words, the number of I/O pins on an IC limits the number of signals that can be input to or output from the IC at any given instant. It can therefore be beneficial to have many I/O pins for an IC. However, each of these I/O pins occupies a finite amount of "real estate" on the IC packaging. Consequently, for a given IC packaging size, there are a finite number of I/O pins that may be included and, potentially, a limited amount of features that may be provided at a given throughput. In other words, the physical size of an IC can limit its performance to the extent that the corresponding number of I/O pins is limited.

From a pin count perspective, it may therefore appear to be advantageous to increase the size of the IC die and packaging in order to maximize pin count to accommodate all desired features. However, the cost of the IC, especially of the IC die, increases dramatically as the size of the die increases. Also, the ability to construct compact electronic devices is hindered when the size of the overall IC packaging is increased. Hence, there is a conflict between (i) reducing the size and cost of an IC and (ii) adding functionality thereto that is I/O dependent due to pin count limitations. This conflict between pin count demands and performance goals is exacerbated with ICs that employ differential signaling because two I/O pins are usually used to communicate one signal.

BRIEF DESCRIPTION OF THE DRAWINGS

In the Drawings, like numerals are used for like and/or corresponding features, aspects, and components of the various FIGS. 1–8.

DETAILED DESCRIPTION

Figure 1:
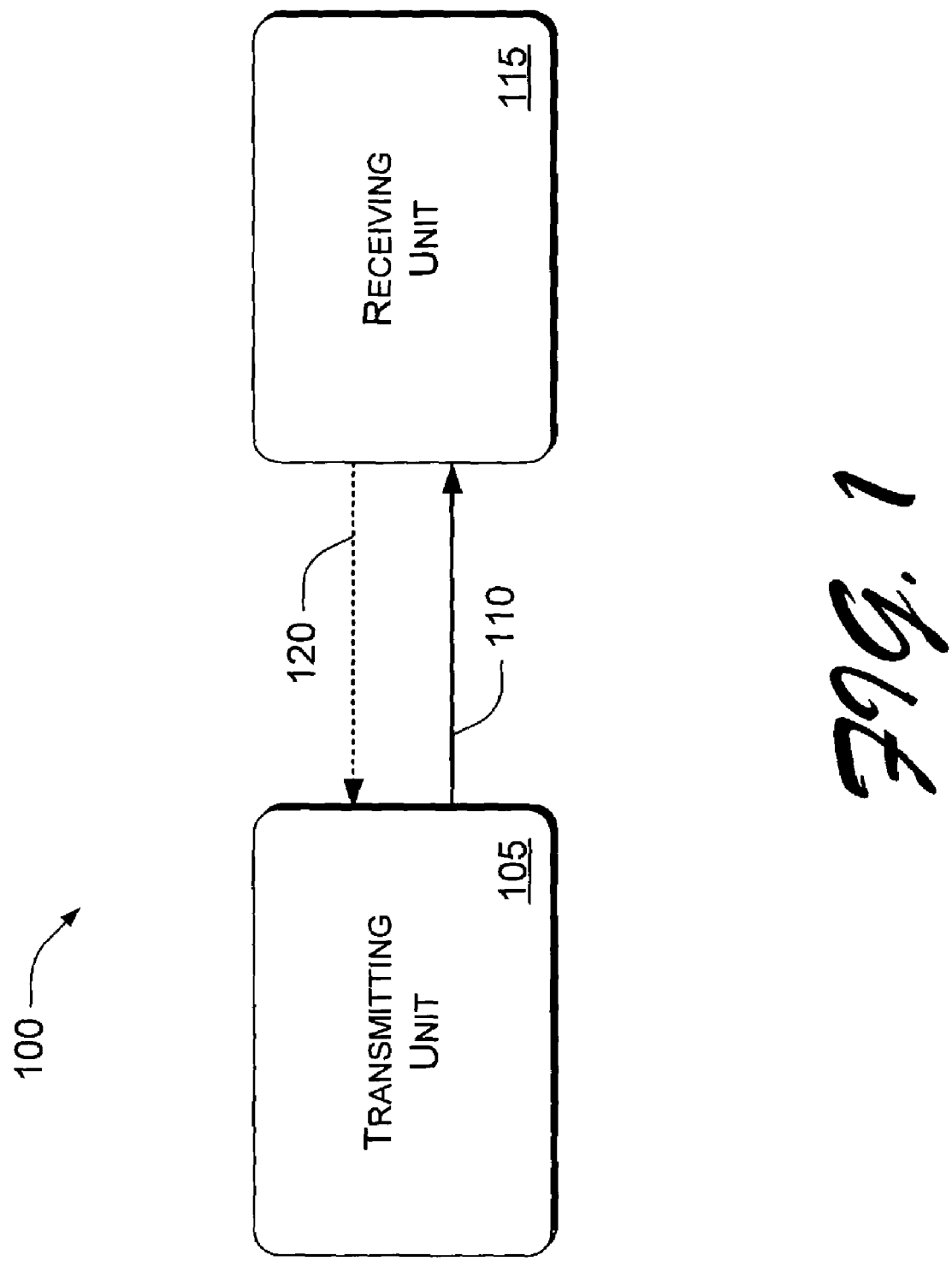
FIG. 1 is a block diagram that illustrates signaling between exemplary electronic units.

FIG. 1 is a block diagram of a system 100 that employs signaling between exemplary electronic units. A transmitting unit 105 sends a signal 110 to a receiving unit 115. The receiving unit 115 receives the signal 110 from the transmitting unit 105. The units 105 and 115 include components for transmitting and/or receiving the signal 110, and each may additionally include other components related to other functions. Although only a single signal 110 is shown being transmitted from the transmitting unit 105 to the receiving unit 115, in many cases there may be multiple signals transmitted from the transmitting unit 105 to the receiving unit 115, and the units shown may have multiple transmitters and receivers for handling such multiple signals. Additionally, one or more signals may be transmitted from the receiving unit 115 to the transmitting unit 105, as indicated by the dashed arrow representing optional signal(s) 120.

The transmitting unit 105 and the receiving unit 115 may be on the same integrated circuit, may be on different integrated circuits (e.g., on a single printed circuit board (PCB) or different PCBs), may be on separate components (e.g., separate cards, modules, etc. connected by one or more buses, etc.), and so forth.

Although the signal(s) 110 and 120 can be any general signal capable of communicating information, the signals may be digital or analog signals in the described implementation(s). If the signals are digital, for example, they may relate to memory read/write data, control data, address data, and so forth. However, such digital signals may more generally represent binary data in any computing system.

The signal 110 is subject to signal degradations—such as voltage changes—as it propagates between the transmitting unit 105 and the receiving unit 115. In order to mitigate the effects of such signal degradations, the signals may be propagated as differential signals. Differential signals are generally more robust in the face of voltage changes, noise, and other interfering and degrading effects. However, two signal lines, and thus two I/O pins per chip, are used to communicate a single information signal using differential signaling.

Figure 2:
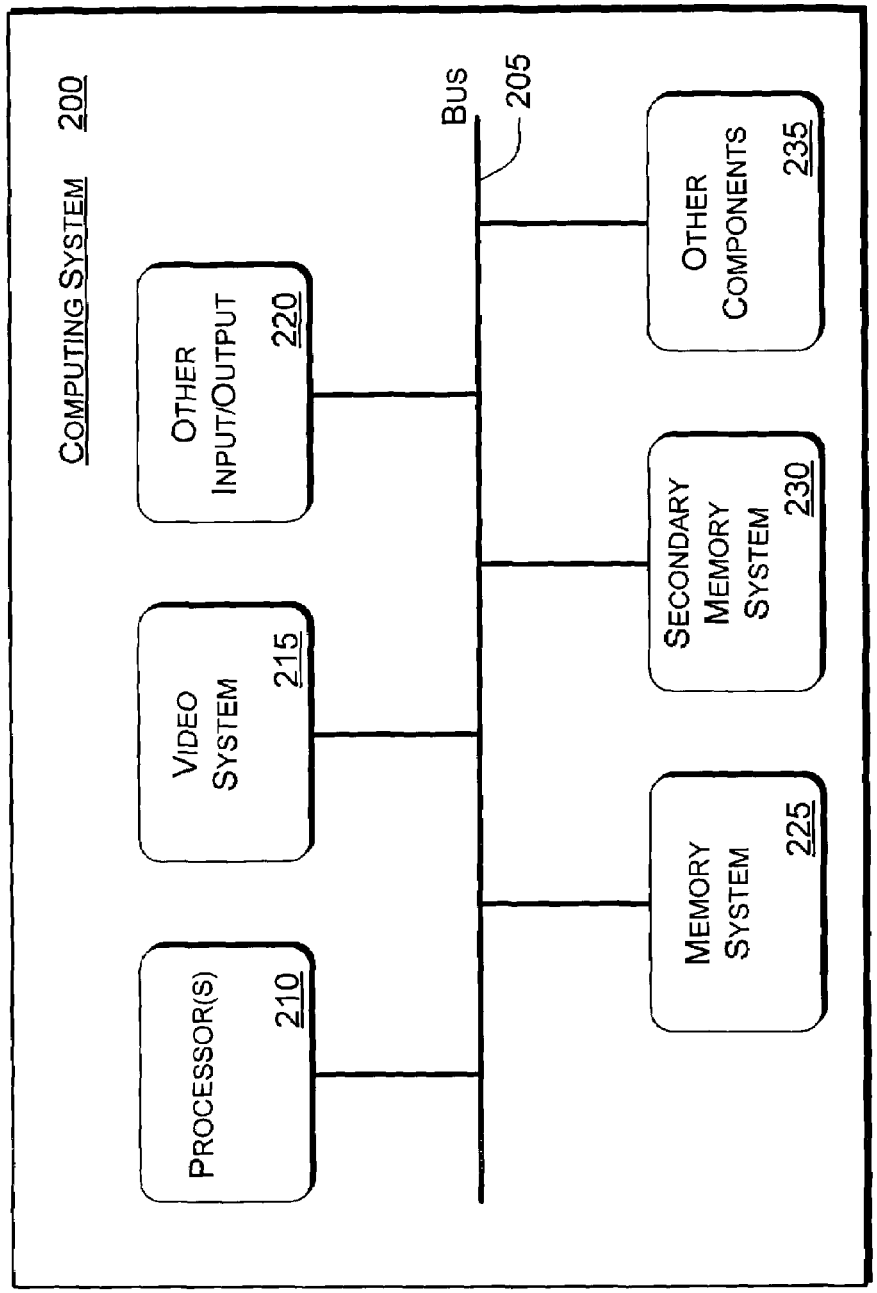
FIG. 2 is a block diagram that illustrates an exemplary computing system having components that are capable of communicating information using different signaling types.

FIG. 2 is a block diagram that illustrates an exemplary computing system 200 that has signaling components that are capable of communicating information using different signaling types. Both the computing system 200 as a whole and the individual components thereof may act as a transmitting unit 105 and/or a receiving unit 115 (of FIG. 1). For example, the components of the computing system 200 may receive signals over the bus 205, and they may therefore constitute receiving units 115. When a given component is also capable of transmitting signals, it may constitute a transmitting unit 105 in a particular signal exchange between two units. The bus 205 may have one or more lines, with the lines being wires, interconnects across a PCB, and so forth. The bus 205 may operate under any one or more of many different types of signaling protocols, including a differential signaling protocol.

The exemplary computing system 200 includes one or more processors 210, a video system 215 (e.g., a graphics card or similar), and other input/output 220 hardware. The exemplary components may additionally include a memory system 225 (e.g., a so-called primary memory system), a secondary memory system 230, and other components 235. Each of these components potentially acts as a transmitting unit and/or a receiving unit with respect to one or more signals. Each illustrated component might be implemented as a single device or as a combination of discrete devices.

Figure 3:
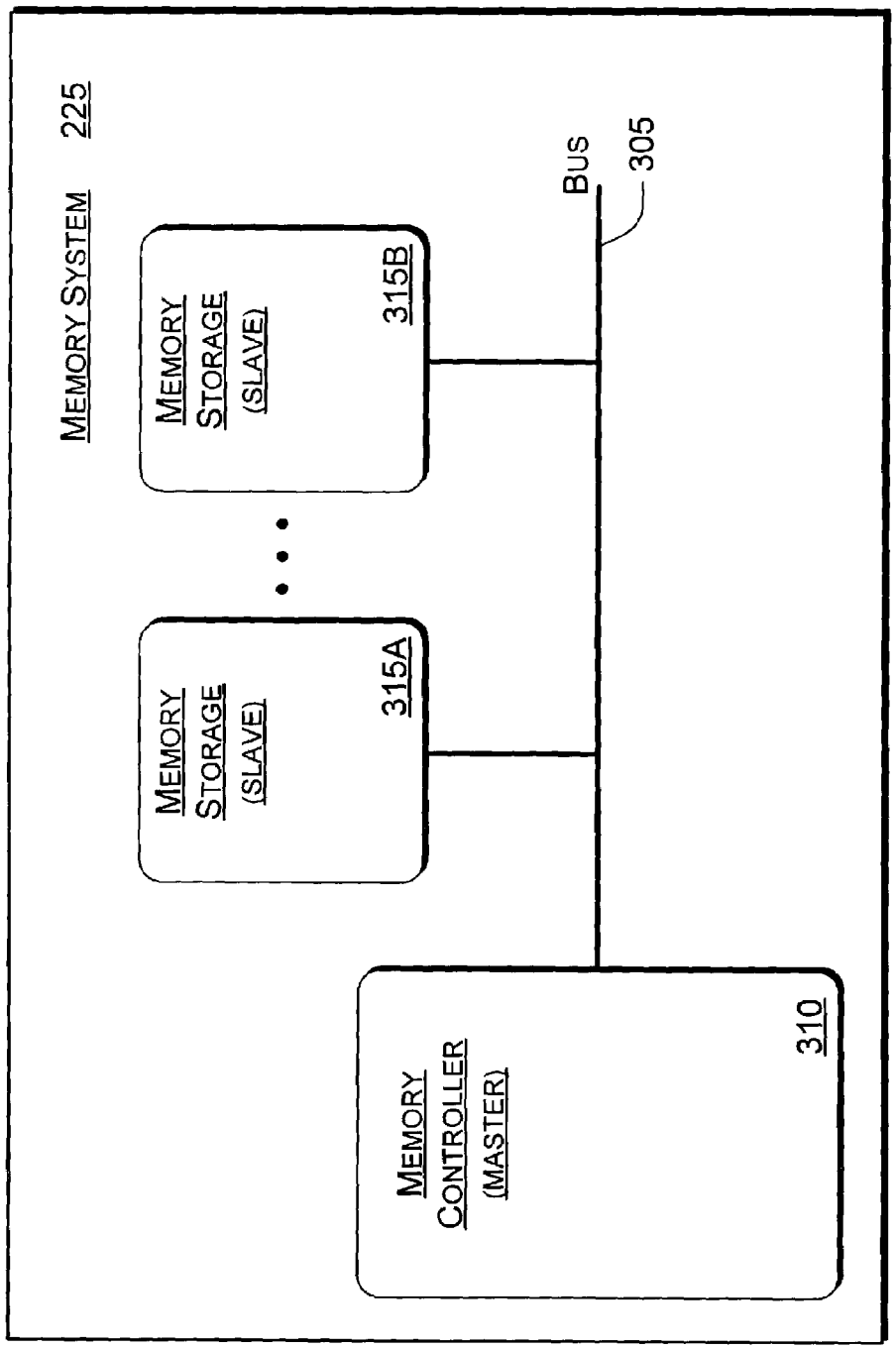
FIG. 3 is a block diagram that illustrates an exemplary memory system having memory modules that are capable of communicating information using different signaling types.

FIG. 3 illustrates an exemplary memory system 225 having memory modules 310 and 315 that are capable of communicating information using different signaling types. In the described implementation, a memory controller module 310 is capable of communicating with memory storage modules 315A and 315B over a bus 305. The memory modules 310 and 315 may be discrete components such as ICs. They are able to communicate over the bus 305 using a signaling such as differential signaling. The bus 305 may interconnect the memory modules 310 and 315 using any of many possible bus architectures and protocols. For example, the memory modules 310 and 315 may operate in a master-slave relationship, as labeled parenthetically. In such a relationship, the master engages in a bi-directional communication with any of multiple slaves, while each of the slaves communicates bi-directionally with the master. Consequently, any one or more of the memory modules 310 and 315 may comprise a receiving unit and/or a transmitting unit.

More specifically, in the exemplary implementation of FIG. 3, a memory controller module 310 controls (e.g., controls reads from and writes to) one or more memory storage modules 315. Although only two such memory storage modules 315A and 315B are illustrated, three, four, or more memory storage modules 315 as indicated by the ellipses may alternatively be controlled by one or more memory controllers 310. The memory modules 310 and 315 form a memory system constructed and/or operating in accordance with any one or more of many different types of memory. These different types of memory include, but are not limited to, dynamic random access memory (DRAM), extended data out (EDO) DRAM, static random access memory (SRAM), synchronous DRAM (SDRAM), double data rate (DDR) SDRAM, Rambus® DRAM, and so forth.

The memory storage modules 315A and 315B each include multiple memory storage cells. (The memory controller 310 may also include storage cells, especially those used for buffering, such as caching, transfer latching, and so forth.) The memory controller 310 and the memory storage modules 315 may each include various control circuits to facilitate writing to and reading from the multiple memory storage cells. The memory modules 310 and 315 may also include differential and/or pseudo-differential transmitters and receivers for internal and/or chip-to-chip communications, especially when signals are propagated over the bus 305 using differential signaling.

Generally, differential signaling uses two lines to transmit a single signal. More specifically, differential signaling employs two lines in which each transmits one sub-signal that together propagate a single information signal. The two sub-signals communicate a single logic value to increase the robustness of the communication. Using the two sub-signals in differential signaling increases the likelihood that the intended information signal is recoverable at a receiving unit, even when signal-degrading effects are present. The resulting robustness of the information signal enables information to be transmitted at very high speeds.

Thus, differential signaling is used to achieve very high transmission rates using two sub-signal lines that have different voltage values. In effect, the difference between the two different voltage values is used to evaluate a logic value. If the difference is greater than a predetermined threshold or reference value, then a first logic state is represented by the two different voltages. If, on the other hand, the difference is less than the predetermined threshold or reference value, then a second logic state is represented by the two different voltages. This threshold or reference value may be any voltage level as specified for a given system, including but not limited to zero volts (0 V).

In some implementations, in addition to the magnitude of the difference, the sign of the difference may be relevant for evaluating the logical value of the differential signal. For example, the two different voltage values may be 1.5V and 0V, so the difference between them is 1.5V or −1.5V. Also, the two different values may be the complement of one another: DQ and DQ* (where DQ* is the complement of DQ). In electronic devices where signals can be voltage dependent, DQ and its complement DQ* may be designed to swing between a high voltage V+ and a low voltage V−. The voltage values therefore swing such that $|(V+)-(V-)|=V_{swing}$. In other words, $(V+)-(V-)=V_{swing}$ or $-V_{swing}$. These voltage values of $V_{swing}$ or $-V_{swing}$ are then used to represent a logical 1 and a logical 0, or vice versa, in complementary implementations.

Figure 4:
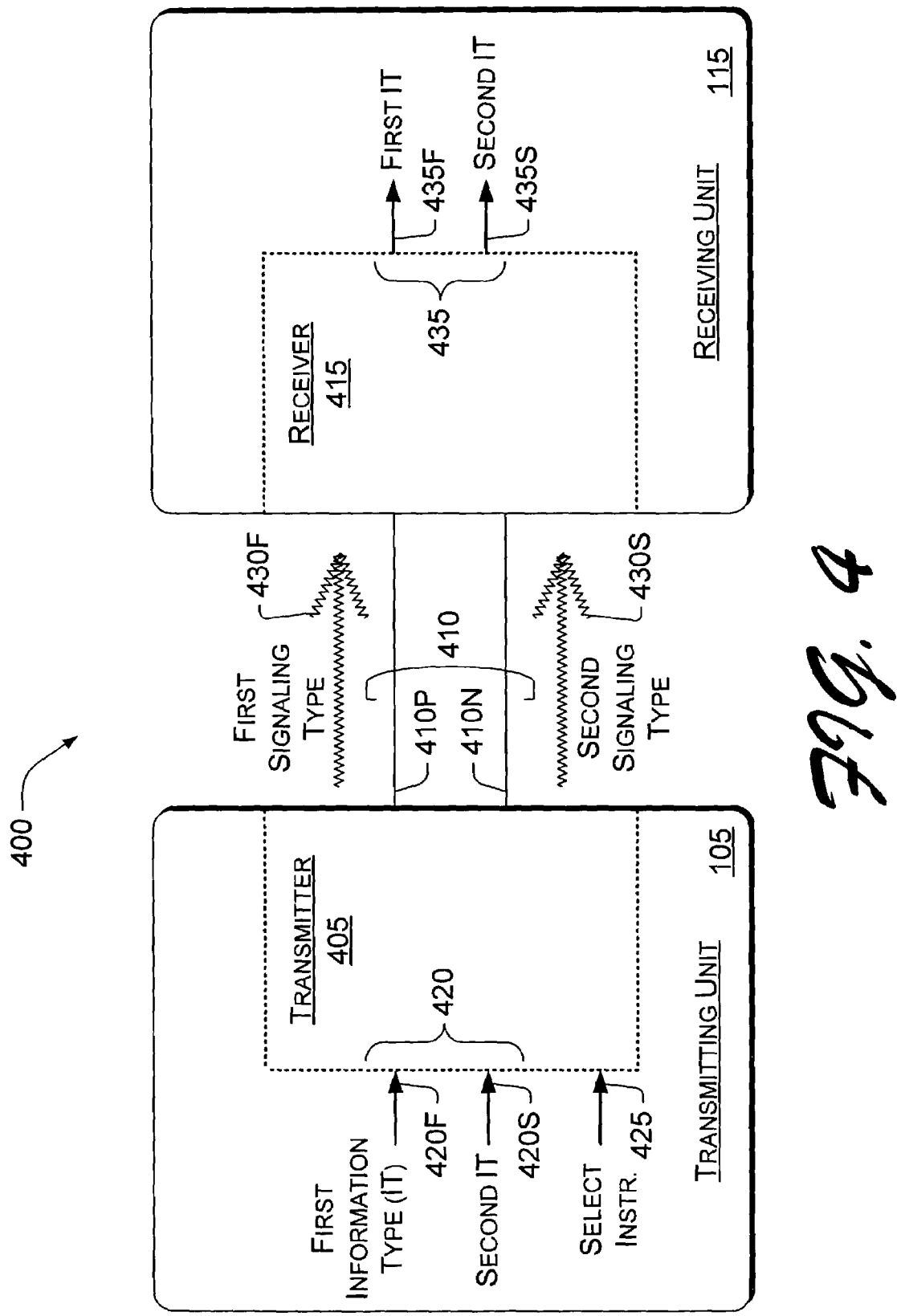
FIG. 4 is a block diagram that illustrates an exemplary implementation of a transmitting unit and a receiving unit that are capable of communicating information using different signaling types over a multiple-line bus.

FIG. 4 is a block diagram that illustrates an exemplary implementation 400 of a transmitting unit 105 and a receiving unit 115 that are capable of communicating different information types using different signaling types over a multiple-line bus. The implementation 400 includes a transmitting unit 105 having a transmitter 405 that is coupled to a bus 410 and a receiving unit 115 having a receiver 415 that is also coupled to the bus 410. The bus 410 includes two sub-signal lines 410P and 410N. However, the bus 410 may include more than two lines.

Generally, the transmitter 405 receives inputs 420. These inputs 420 include a first information type (IT) input 420F, a second information type input 420S, and a select instruction input 425. These inputs 420, optionally in conjunction with the select instruction input 425, are analyzed by the transmitter 405 to produce an information/communication signal that is placed on the bus 410. The receiver 415 detects the communication signal on the bus 410 and analyzes it. The receiver 415 produces outputs 435, such as a first information type output 435F and a second information type output 435S. After analyzing the communication signal from the bus 410, the receiver 415 outputs a first information type signal on the first information type output 435F or a second information type signal on the second information type output 435S, as appropriate.

More specifically, the transmitter 405 analyzes the inputs 420 to determine whether information of a first type (e.g., from the first information type input 420F) or information of a second type (e.g., from the second information type input 420S) is to be transmitted over the bus 410. This determination may be made based on select information from the select instruction input 425. If the information of the first type is to be transmitted, then the transmitter 405 transmits the information of the first type over the bus 410 using a signaling of a first type 430F. If, on the other hand, the information of the second type is to be transmitted, then the transmitter 405 transmits the information of the second type over the bus 410 using a signaling of a second type 430S.

The receiver 415 detects the communicated signal and analyzes it based on whether the signal comprises the signaling of the first type 430F or the signaling of the second type 430S. If the information signal is received using the signaling of the first type 430F, then the receiver 415 interprets the information as the information of the first type. If, on the other hand, the information signal is received using the signaling of the second type 430S, then the receiver 415 interprets the information as the information of the second type. The information of the first type is then forwarded from the receiver 415 using the first information type output 435F, and the information of the second type is forwarded from the receiver 415 using the second information type output 435S.

Under the implementation described above, many alternatives are possible. For example, the information of the first type may be data information, and the information of the second type may be control information. The signaling of the first type 430F may be differential signaling, and the signaling of the second type 430S may be single-ended signaling. Thus, an exemplary implementation entails communicating data information using differential signaling and communicating control information using single-ended signaling.

However, other alternatives may be employed. For example, with respect to different types of information, two different types of data information or two different types of control information may be transmitted. Also, first and second portions of an address may be transmitted as the first and second information types. With respect to different types of signaling, a multi-level signaling may alternatively be employed such as a pulse amplitude modulation (PAM) signaling. Generally, N-PAM involves N different states. As a specific example, 2-PAM involves 2 different states. Other types of signaling modulation may be used instead, either individually or in combination with those described herein.

Although a receiving unit need not be explicitly informed by way of an instruction "command" or signal as to the type of signaling or information to expect, a transmitting unit may optionally prepare the receiving unit by so informing it. Additionally, while a primary or upstream receiving unit may interpret/determine the information type responsive to the signaling type that is received, this upstream receiving unit may then explicitly inform secondary or downstream receiving units as to what information and/or signaling type to expect.

In another implementation, different types of information may be communicated at different speeds using the bus 410. Thus, the first and second signaling types 430F and 430S may be signaling at first and second speeds. For example, control information may be communicated over the bus 410 at a slower rate than data information.

More specifically, in certain environments, it may be preferable or at least acceptable to transmit one type of information more slowly than another type of information. For example, in a memory system in which data information corresponds to a first type of information and control information corresponds to a second type of information, each bit of an eight-bit byte may transmit information of either the first or the second type independently of which type of information the other bits in the byte are transmitting. If control information is applicable to the entire data byte, then the control information may be transmitted once during all or a portion of the time that the eight bits are being transmitted.

An example of a memory command that applies to an entire byte of data is the mask byte operation. In a mask byte operation, an entire byte is masked off from (i.e., not written or rewritten to) a memory array of a memory storage module. Consequently, during the time it would normally take to write eight bits of data information to the memory array, only one item or piece of control information (e.g., a mask byte memory command) need be provided to the memory storage module.

Thus, with respect to an exemplary implementation 400, the transmitter 405 may ordinarily utilize a given unit of time to transmit a block of data having a predetermined number of sub-blocks over the bus 410. Likewise, the receiver 415 may ordinarily take the same given unit of time to receive all of the predetermined number of sub-blocks of the block of data via the bus 410. Hence, the receiver 415 is capable of detecting multiple sub-blocks of data during the given unit of time. However, if an item or piece of control information is to be transmitted that relates to the entire block of data, then the transmitter 405 may transmit the item or piece of control information over the bus 410 during all or a portion of the same given unit of time.

Likewise, the receiver 415 receives the item or piece of control information via the bus 410 during all or a portion of the same given unit of time. In other words, the receiver 415 is permitted to detect the one item or piece of control information in a span of time in which multiple sub-blocks, or all sub-blocks, of the block of data must ordinarily be detected. Consequently, the control information may be communicated at one speed while the data information is communicated at another speed. In this particular described implementation, the communication speed or rate of transmission and reception of the data information is greater than that of the control information.

To facilitate the description of specific alternative implementations, transmitting a first information type using a first signaling type may be considered a first mode of operation, and transmitting a second information type using a second signaling type may be considered a second mode of operation. Thus, an implementation such as that of FIG. 5 may involve two or more modes of operation. In a first mode of operation, the line 410P has a different voltage value than that of the line 410N such that differential signaling is propagated over the bus 410. In a second mode of operation, the line 410P and the line 410N have voltage values that are approximately equal (including actually equal) such that single-ended signaling is propagated over the bus 410. In the described implementation of FIG. 5, the first mode of operation corresponds to a data mode of operation and the second mode of operation corresponds to a control mode of operation.

Figure 5:
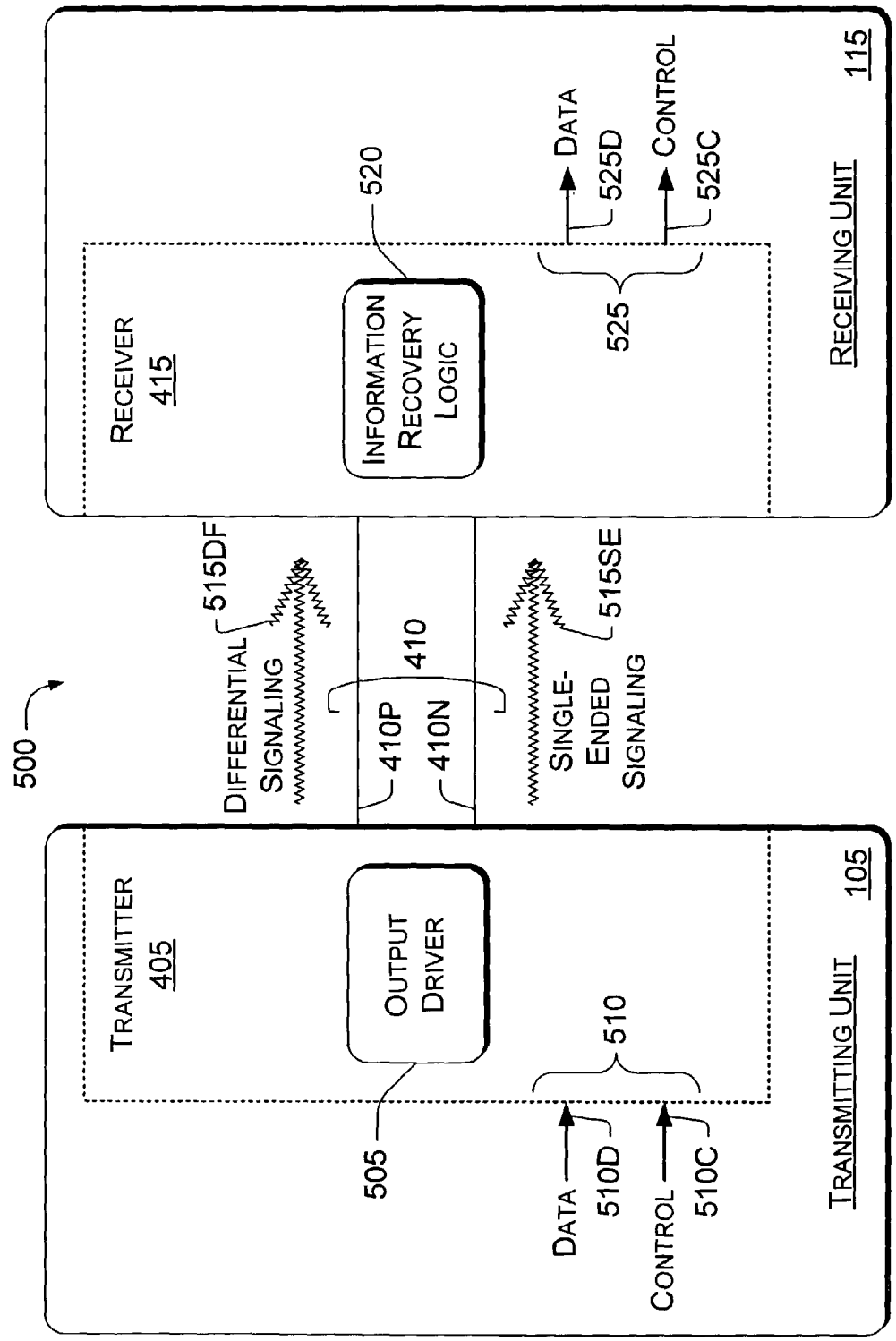
FIG. 5 is a block diagram that illustrates an exemplary implementation of a transmitting unit and a receiving unit that are capable of communicating data information and control information using differential signaling and single-ended signaling.

FIG. 5 is a block diagram that illustrates another exemplary implementation 500 of a transmitting unit 105 and a receiving unit 115 that are capable of communicating data information and control information using differential signaling and single-ended signaling, respectively, across a bus 410. The transmitting unit 105 and the receiving unit 115 thus form a system that is capable of communicating both data and control information over the bus 410. The transmitting unit 105 includes a transmitter 405 that is adapted to transmit data information using differential signaling and control information using single-ended signaling over the bus 410. The receiving unit 115 includes a receiver 415 that is adapted to receive such data information in a differential signaling format and such control information in a single-ended signaling format via the bus 410. The transmitter 405 accepts data and control information through inputs 510, and receiver 415 provides data and control information through outputs 525.

A differential signaling format is created when two sub-signals of a communication signal have differing voltages, and a single-ended signaling format is created when two sub-signals of a communication signal are approximately equal. Whether two voltages differ or are approximately equal varies depending on the system. In other words, a system designer may establish determining thresholds. In an exemplary system context, two voltages may be considered to differ from each other when one voltage is at least 100 mV greater than the other voltage. Two voltages may be considered approximately equal when they differ by less than or equal to 20 mV. These differential and single-ended signaling formats are used to encode and to identify data information and control information for communication between the transmitting unit 105 and the receiving unit 115.

In the exemplary implementation 500 of FIG. 5, the transmitter 405 of the transmitting unit 105 includes an output driver 505. The receiver 415 of the receiving unit 115 includes information recovery logic 520. The output driver 505 encodes data information into differential signaling and control information into single-ended signaling and drives appropriate voltages on the bus 410. Differential signaling 515DF that carries the data information is driven onto the bus 410 using differing voltages. Single-ended signaling 515SE that carries the control information is driven onto the bus 410 using approximately equal voltages. The information recovery logic 520 receives the voltages from the bus 410 and recovers the information as data information or control information, depending on whether the voltages are in a differential signaling 515DF format or a single-ended signaling 515SE format, respectively.

More specifically, the output driver 505 receives information directly or indirectly from inputs 510. In this implementation, a select instruction input is not used. When data information is present at data input 510D, the output driver 505 drives the signal lines 410P and 410N with different voltages. The information recovery logic 520 detects that the signal lines 410P and 410N have different voltages, and it recovers the original data information therefrom and forwards such data information on data output 525D. If, on the other hand, control information is present at the control input 510C, then the output driver 515 drives approximately equal voltages onto the signal lines 410P and 410N. The information recovery logic 520 detects that the signal lines 410P and 410N have approximately equal voltages, and it recovers the original control information therefrom and forwards such control information on control output 525C. The receiving unit 115 may thereafter perform some function responsive to the control information. For example, in an exemplary memory system implementation, the receiving unit 115 may mask a byte of data responsive to a mask byte command.

Figure 6:
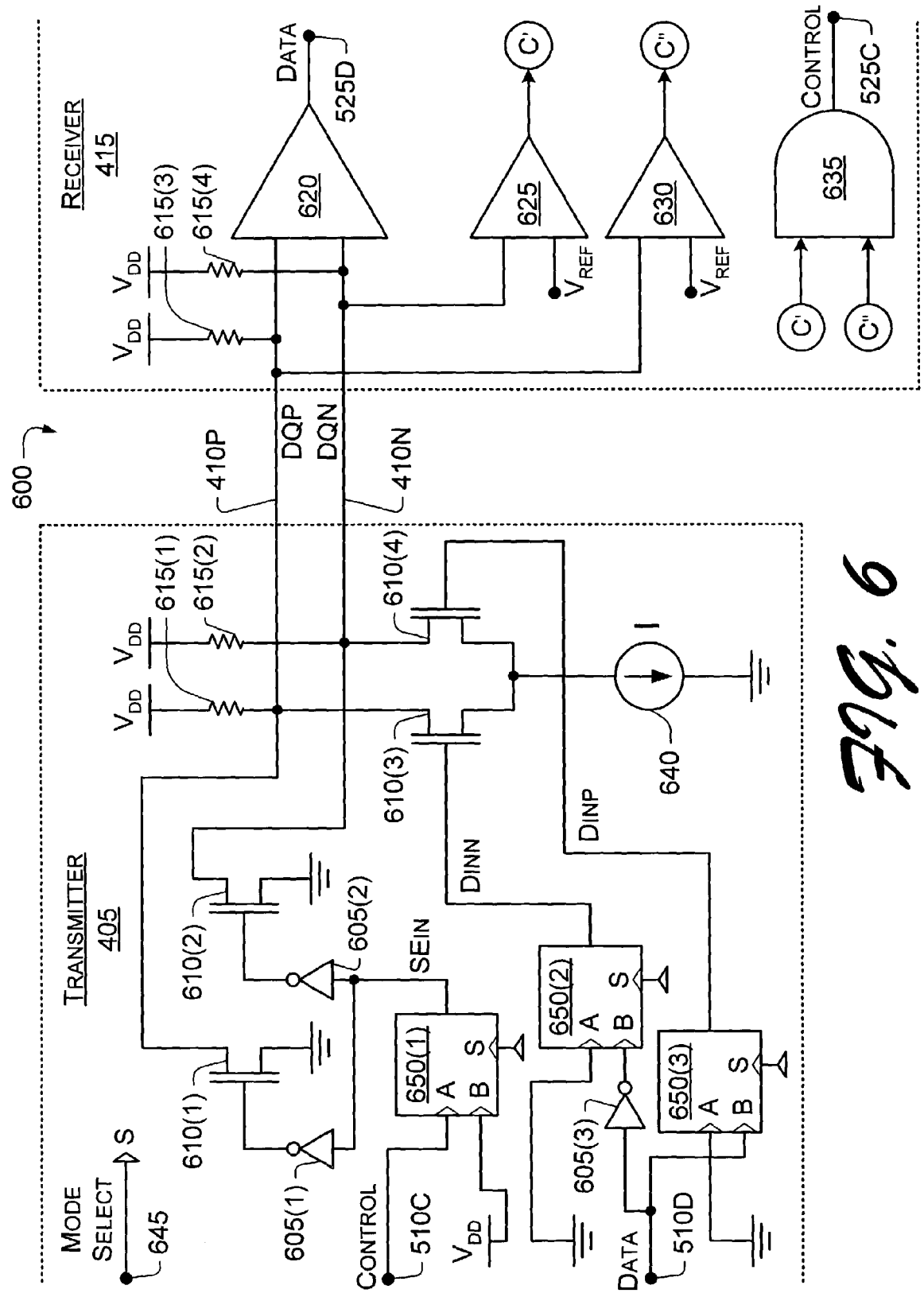
FIG. 6 is a schematic view of an exemplary implementation of a transmitter and a receiver that are capable of communicating data information and control information using differential signaling and single-ended signaling.

FIG. 6 is a schematic view of an exemplary implementation 600 of a transmitter 405 and a receiver 415 that are capable of communicating data information and control information using differential signaling and single-ended signaling, respectively, across a bus having a first signal line 410P and a second signal line 410N. In the exemplary implementation 600 as described herein, the transmitter 405 and the receiver 415 are each electrically coupled to both of the first signal line 410P and the second signal line 410N. The transmitter 405 includes three inverters 605, four transistors 610, three multiplexers 650, and at least one current source 640 that may together comprise the output driver 505 (of FIG. 5), with the addition of a mode select input 645. The receiver 415 includes a differential receiver 620, two pseudo-differential receivers 625 and 630, and a control block 635 that may together comprise the information recovery logic 520. It should be understood that the output driver 505 and the information recovery logic 520 may alternatively be implemented in other hardware.

In the exemplary implementation 600, the transmitter 405 and the receiver 415 may communicate in at least two modes of operation. In a first mode of operation, the signals DQP and DQN, which are transmitted across the signal lines 410P and 410N, respectively, comprise voltages levels that differ from each other. The voltage values of the signals DQP and DQN may be set to complementary values V+ and V−, or any other voltage values that differ from each other by more than the predetermined differential threshold. This mode may be considered a normal or data mode of operation. In a second mode of operation, the signals DQP and DQN are set to voltage values that are approximately equal. The signals DQP and DQN may thus both be set equal to V+, V−, or some other voltage. This mode may be considered a command or control mode of operation.

In the exemplary implementation 600, activation of the data mode or the control mode of operation is determined via the mode select input 645, which may correspond to the select instruction input 425 (of FIG. 4). The mode select input 645 is fed into the select input "S" of each of the three multiplexers 650, which also each have "A" and "B" inputs as well as an output. As described further below, when the mode select input 645 is low and the "A" inputs of the three multiplexers 650 are therefore selected, the control mode is activated. When the mode select input 645 is high and the "B" inputs of the three multiplexers 650 are therefore selected, the data mode is activated. Although the mode select input 645 and the three multiplexers 650 are used in FIG. 6, data mode versus control mode may alternatively be selected merely by directly driving only the desired input, either data input 510D or control input 510C, without using multiplexers 650. The transmitter 405 and the receiver 415 of FIG. 6 are described firstly with respect to the data mode of operation and secondly with respect to the control mode of operation.

In the normal or data mode of operation, data information at the data input 510D is split into two lines, with the mode select input 645 being set to high. One line of the two lines is supplied to an inverter 605(3). These two lines carry/produce $D_{INN}$ and $D_{INP}$ and are provided to the "B" inputs of the multiplexers 650(2) and 650(3). In the data mode of operation, the mode select input 645 is set high so that the "B" inputs of the three multiplexers 650 are activated. For the multiplexer 650(1), $V_{DD}$ is forwarded to the output thereof. This $V_{DD}$ is driven onto the $SE_{IN}$ signal so that both of the transistors 610(1) and 610(2) are turned off.

For the multiplexers 650(2) and 650(3), $D_{INN}$ and $D_{INP}$ are forwarded to the respective outputs thereof. These $D_{INN}$ and $D_{INP}$ signals are supplied to the gates of a differential pair of transistors 610(3) and 610(4). Specifically, the output of the inverter 605(3) $D_{INN}$ is applied to the gate of the transistor 610(3) by way of the "B" input and the output of the multiplexer 650(2). The non-inverted data information $D_{INP}$ is applied to the gate of the transistor 610(4) by way of the "B" input and the output of the multiplexer 650(3). A current source 640 is also connected to one terminal of each of transistor 610(3) and 610(4).

In addition to the transistors 610(3) and 610(4) (and the current source 640), the output portion of the transmitter 405 includes two pull-up resistors 615(1) and 615(2). These pull-up resistors 615(1) and 615(2) are connected between the voltage $V_{DD}$ and the transistors 610(3) and 610(4), respectively. The two signal lines 410P and 410N are electrically connected between the pull-up resistors 615(1) and 615(2) and the transistors 610(3) and 610(4), respectively. Voltages from the differential pair of transistors are therefore driven on the signal lines 410P and 410N, which are jointly referred to as bus 410. Specifically, the different voltages corresponding to the $D_{INN}$ and $D_{INP}$ are driven over the bus 410. The receiver 415 receives the different voltages corresponding to the $D_{INN}$ and $D_{INP}$ via the bus 410.

The bus 410 is electrically connected to the receiver 415 at individual junctions for the signal lines 410P and 410N. These input junctions are connected to the voltage $V_{DD}$ by pull-up resistors 615(3) and 615(4). These input junctions are also connected to the differential receiver 620. In the data mode of operation, the differential receiver 620 recovers the data information and forwards it on the data output 525D. For example, if the signal line 410P is at a high voltage and the signal line 410N is at a low voltage, then the differential receiver 620 forwards a high voltage, or a logical one. If, on the other hand, the signal line 410P is at a low voltage and the signal line 410N is at a high voltage, then the differential receiver 620 forwards a low voltage, or a logical zero.

However, other bus 410 voltage pairs and logical assignments thereto may alternatively be employed. For example, the differential receiver 620 may output a low voltage, which may be assigned a logical value of one, if the signal line 410P is at a high voltage and the signal line 410N is at a low voltage. The input junctions are also connected to the two pseudo-differential receivers 625 and 630, which are utilized in the control mode of operation.

In the command or control mode of operation, control information at the control input 510C is provided to the "A" input of the multiplexer 650(1), with the mode select input 645 being set to low. In the control mode of operation, the mode select input 645 is set low so that the "A" inputs of the three multiplexers 650 are activated. For the multiplexers 650(2) and 650(3), the outputs thereof are driven to ground via the grounded "A" inputs. For the multiplexer 650(1), the single-ended input ($SE_{IN}$) is forwarded from the output thereof by way of the "A" input. This output of the multiplexer 650(1) is split into two lines.

Each line of the two lines carries/produces the $SE_{IN}$ signal that is supplied to inverters 605(1) and 605(2). The control information is inverted in this implementation to account for the inversions inherent with the transistors 610(1) and 610(2). Regardless, approximately equal voltages are applied to the gates of the transistors 610(1) and 610(2). Specifically, the output of the inverter 605(1) is applied to the gate of the transistor 610(1), and the output of the inverter 605(2) is applied to the gate of the transistor 610(2). Optionally, another current source (not shown), or the current source 640, may also be connected to one terminal of each of the transistors 610(1) and 610(2).

Consequently, voltages from the transistors 610(1) and 610(2) are driven on the signal lines 410P and 410N. Specifically, the approximately equal voltages corresponding to the $SE_{IN}$ are driven over the bus 410. The receiver 415 therefore receives the approximately equal voltages corresponding to the $SE_{IN}$ of the control information via the bus 410. At the input junctions where the bus 410 is electrically connected to the receiver 415, two pseudo-differential receivers 625 and 630 receive the two approximately equal voltage values. It should be noted that the differential receiver 620 also receives the two approximately equal voltage values from the input junctions, but no valid output is created therefrom because the differential receiver 620 is designed to interpret two different voltage values.

The pseudo-differential receiver 625 receives the voltage value from the signal line 410N as a first input, and the pseudo-differential receiver 630 receives the voltage value from the signal line 410P also as a first input. Each of the two pseudo-differential receivers 625 and 630 also receive as a second input a reference voltage value $V_{REF}$, to which the first inputs are compared. This comparison results in a C' output from the pseudo-differential receiver 625 and a C" output from the pseudo-differential receiver 630. Each of the two pseudo-differential receivers 625 and 630 produce a first voltage output value if their first input is higher than their second input and a second voltage output value if their first input is lower than their second input.

Because the control mode of operation is active, the same voltage levels have been applied to the two signal lines 410P and 410N of the bus 410. The C' output of the pseudo-differential receiver 625 will therefore be the same as the C" output of the pseudo-differential receiver 630. These C' and C" outputs are applied to a control block 635. The control block 635 is designed to only produce a valid output when the C' and C" outputs are equal. For example, in the implementation 600 as illustrated in FIG. 6, the control block 635 is an AND gate. Such an AND gate implementation of the control block 635 produces a logically positive output to be forwarded on the control output 525C only when both of the C' and C" outputs are logically positive.

It should be understood that other voltage values and logical assignments may alternatively be used for communicating and analyzing the control information. Furthermore, a more complex control block 635 implementation may alternatively be employed to provide additional features and/or control options. Implementations of some exemplary additional features and/or control options are described below.

Absolute and relative voltage levels of the inputs and outputs of the two pseudo-differential receivers 625 and 630, as well as those of the control block 635, may vary depending on the voltage values selected when designing and operating transmitters 405 and receivers 415 that are connected by one or more buses 410. For example, the control output of the control block 635 may be set to a high voltage if both of the signal lines 410P and 410N are at a voltage that is higher than $V_{REF}$. In this case, the control output of the control block 635 is then set to a low voltage if both of the signal lines 410P and 41 ON are at a voltage that is lower than $V_{REF}$. The selection of $V_{REF}$ depends on the voltage levels used to send the control information (such as a memory command).

In an exemplary implementation, sub-signals DQP and DQN swing between V+ and V−, where DQP and DQN are the voltage values of the signal lines 410P and 410N, respectively. If DQP DQN=V+ is used to send the control information, then $V_{REF}$ is set between V+ and V−, but closer to V− than to V+ to increase the noise margin. If, on the other hand, DQP=DQN=V− is used to indicate the control information, then $V_{REF}$ is set between V+ and V− but closer to V+ than to V− to increase the noise margin. If both DQP=DQN=V+ and DQP=DQN=V− are used to send control information (e.g., possibly two different commands), then $V_{REF}$ is set approximately to the mid-point between V+ and V− to maximize the noise margin.

In the exemplary implementation 600 of FIG. 6, the better noise margin for sending control information is established by setting DQP=DQN=V+=$V_{DD}$, at least in the context of selecting between setting DQP=DQN=V+=$V_{DD}$ and DQP=DQN=V−. If DQP=DQN=V− is used for sending control information, then both of the transistors 610(1) and 610(2) have to be turned on. Although the gate voltages may be the same, any mismatch in the transistors 610(1) and 610(2) can create a differential voltage between DQP and DQN. Any such differential voltage between DQP and DQN can reduce the noise margin at the pseudo-differential receivers 625 and 630. It should be understood that the approximately equal voltages of DQP and DQN for communicating control information using single-ended signaling need not be equal to either V+ or V−. Also, the different voltages of DQP and DQN for communicating data information using differential signaling need not be equal in magnitude with only differing signs.

The nominal voltage levels of the various signals in the exemplary implementation 600 can be set to any level establishable using discrete components and/or ICs. Therefore, the following voltages are provided by way of example and not limitation. The sub-signals DQP and DQN may be set to 1.0 volt [V] or 1.2 V. When the transmitter 405 wishes to send a "11" (double $V_{OH}$) pattern, for example, over the two lines 410P and 410N, the transmitter 405 may simply stop actively driving both lines. The termination/pull-up resistors 615 on both ends of the lines 410P and 410N will pull the lines up to 1.2 V quickly, when $V_{DD}$ is equal to 1.2 V.

The $V_{REF}$ may be generated internally between 1.0 V and 1.2 V. When the $V_{REF}$ is set closer to 1.0 V than to 1.2 V to avoid noise margin on the high end, then $V_{REF}$ may be set to 1.05 V. In this example, the (output driver) current source 640 sources 8 milli-Amps, and the termination resistors 615(1) and 615(2) are 50 Ohms. The receiver 415 can generate $V_{REF}$ by using an identical termination resistor and a current mirror/source that is some fraction (e.g., three-fourths) of the current sourced by the output driver current source 640. The resulting $V_{REF}$ is equal to 1.05 V.

It should be noted that two voltages may be considered approximately equal for, e.g., single-ended signaling when they are equal to within the variations caused by mismatches and other discrepancies resulting from real-world effects of actual (i.e., non-ideal) physical components. For example, as noted above, two voltages may be considered approximately equal if they differ by around 20 mV or less. Two voltages may be considered different, on the other hand, if they differ by around 100 mV or more.

As noted above, the information recovery logic 520 (of FIG. 5) and the exemplary hardware implementing it (of FIG. 6) may be configured to provide additional features and/or control options, especially by implementing a more complex control block 635. The control information is encoded into two identical logical bits, namely 00 or 11, on the bus 410. As explained above, if only one command or other type of control information is to be communicated, then sending two bits that are represented by high voltages can avoid or reduce problems originating from unbalanced transistors 610(1) and 610(2). Such a single command can instruct or require that the receiving unit 115 perform some action. In a memory system 225 implementation in which the transmitting unit 105 is a memory controller module 310 and the receiving unit 115 is a memory storage module 315, the single command can be to mask a byte of data (mask byte), power down, refresh one or more rows of volatile memory (perform a refresh operation), perform a calibration, initialize one or more registers, and so forth.

However, because two different codes are available when using bit pairs having two identical bits (i.e., 00 or 11), two different commands may be implemented in a given system. For example, the receiving unit 115 may be capable of receiving, interpreting, and responsively performing a mask byte operation and a refresh operation using single-ended signaling. In other words, the control block 635 may be implemented such that if C'=1 and C"=1, then a mask byte operation is performed, while a refresh operation is performed if C'=0 and C"=0. The control block 635 ignores differential signaling on the bus 410, which causes one and only one of C' and C" to be equal to 1.

There are also various communication speed/rate and timing-related options that may be implemented. At a slower communication speed/rate, a single command may be provided using single-ended signaling over multiple units of time or data transmissions. For example, in a memory system 225 implementation, eight bits of data information are communicated for each byte of such data information. During a time unit usually reserved for the transmission of an entire byte of data, a single item or piece of control information may be communicated from the memory controller module 310 to the memory storage module 315. Thus, either one of two different commands may be communicated using a logical 00 or 11 during any given unit of time in which eight bits (or one byte) of data could otherwise be transmitted.

At an even slower communication speed/rate, a single command may be communicated over multiple units of time in which multiple bytes of data could have instead been transmitted. However, more than two types of commands or types of control information may be interpreted by the information recovery logic 520 (of FIG. 5) when such a scheme is implemented as follows: the control block 635 (of FIG. 6) is configured to interpret different sets of single-ended signaling transmissions into different commands. Hence, more than two different types of commands or types of control information may be so communicated. For example, a group having sets of three single-ended signaling transmissions may be used for each command.

Such a group of three single-ended signaling transmissions comprises eight different sets: {(00, 00, 00), (11, 00, 00), (00, 11, 00), (00, 00, 11), (00, 11, 11), (11, 00, 11), (11, 11, 00), (11, 11, 11)}. Thus, eight different commands may be interpreted and performed with a group of eight sets. The control block 635 is configured to accumulate three single-ended signaling transmissions before interpreting them into a command. Each set of three single-ended signaling transmissions may be accumulated over three time units in which three bytes of data could otherwise be received. Groups of four sets or more than eight sets may alternatively be used depending on the number of different types of commands/control information to be communicated.

For a faster communication speed/rate, the receiver 415 may be capable of interpreting multiple items of control information per eight bits. For example, during a time unit that is comparable to the transmission of one byte of data information using differential signaling, the following single-ended signaling may be transmitted in order to communicate control information: {00, 00, 11, 11, 00, 00}. These six single-ended signaling transmissions may be bracketed by initial and final differential signaling transmissions of "01" and/or "10". All eight logical value pairs from both signaling types may arrive at the receiver 415 via the bus 410. The six value pairs from the single-ended signaling may comprise two different sets representing two different commands (i.e., (00, 00, 11) and (11, 00, 00)) that are selected from a group of eight possible commands. In this manner, any two of eight commands may be communicated during each byte-length unit of time.

Alternatively, six different commands selected from a group of two possible commands may be communicated during each byte, three different commands selected from a group of four possible commands may be communicated during each byte, and so forth. In this manner, much or all of the control information that needs to be communicated from the transmitting unit 105 to the receiving unit 115 may be communicated over a multi-line bus using single-ended signaling. Furthermore, multiple value pairs may be simultaneously transmitted over multiple parallel bus-line-pairs to accelerate the communication of control information between a transmitting unit 105 and a receiving unit 115. It should be noted that, in contradistinction to the example above, a string of received value pairs for control information need not be "bracketed" with "01", "10", or any other logical representation of differing voltages of differential signaling in all implementations.

Changing the non-differential condition that is placed on the bus 410 by a transmitter 405, and correctly interpreting the changing by a receiver 415, more than once per byte enables a high bandwidth transmission of control information. However, the information recovery logic 520 becomes concomitantly more sensitive to noise. Permitting (or requiring) the information recovery logic 520 to detect only one item or piece of control information over, e.g., four or six bit times of one byte time enables the bandwidth of the information recovery logic 520 to be decreased.

Figure 7:
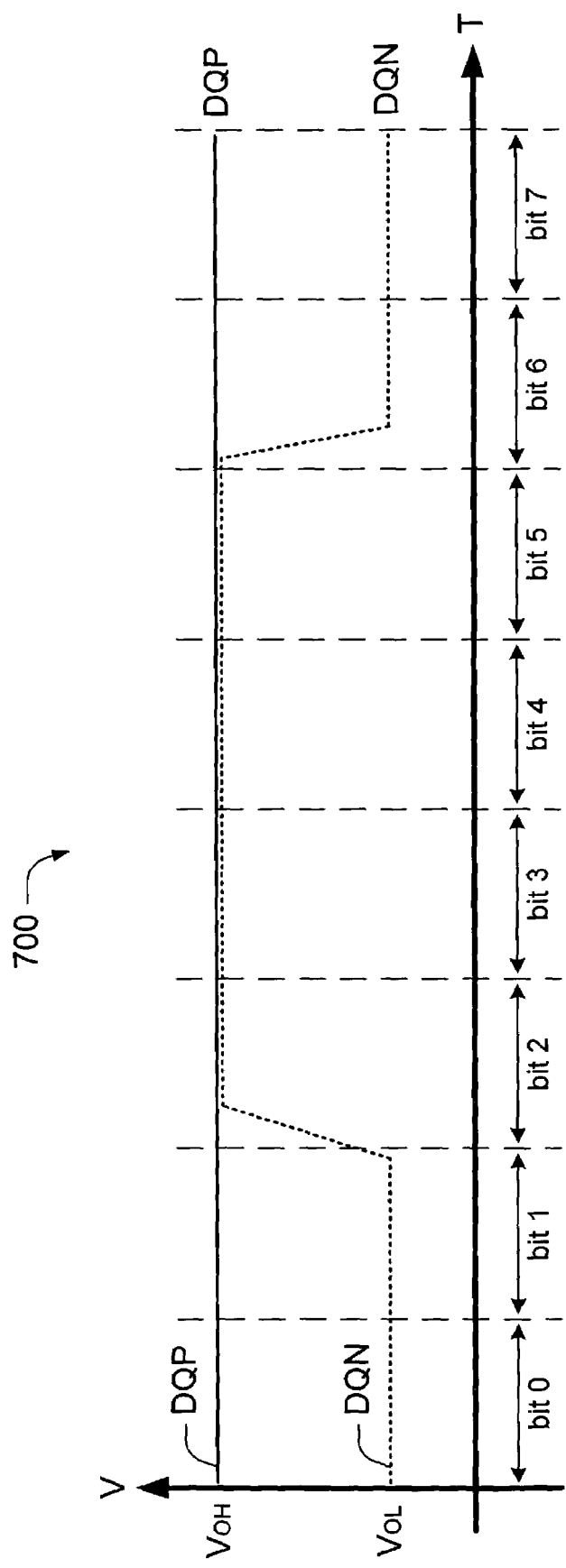
FIG. 7 is a graph of an exemplary implementation of communicating information using differential signaling and single-ended signaling.

FIG. 7 is a graph 700 of an exemplary implementation of communicating information using differential signaling and single-ended signaling. The graph 700 plots time [T] versus voltage [V]. On the voltage axis, the voltages $V_{OH}$ and $V_{OL}$ are identified. On the time axis, eight bit times are denoted as bit 0 to bit 7. The signals DQP and DQN are represented by a solid line and by a dashed line, respectively. These signals DQP and DQN may swing between $V_{OH}$ and $V_{OL}$. The signal DQP is shown at the $V_{OH}$ voltage level throughout the eight bit times. The signal DQN is shown at the VOL voltage level at bit times 0, 1, 6, and 7, and the signal DQN is also shown at the $V_{OH}$ voltage level at bit times 2, 3, 4, and 5. There are also transitional voltage levels shown at and around the two transitions (i) between the bit 1 and bit 2 time periods and (ii) between the bit 5 and bit 6 time periods. These transitions are at least partially indicative of likely real-world attributes of exemplary hardware.

The voltage levels of the signals DQP and DQN in FIG. 7 are presented in Table 1 below. Generally, these voltage levels illustrate that a transmitter, and the corresponding receiver, are capable of transitioning at will and as needed between/among two or more signaling modes. Specifically, the voltage levels below illustrate that the transmitter and the receiver are capable of dynamically switching between first and second signaling types in an intra-byte fashion.

| BIT TIME | VOLTAGE ON DQP | VOLTAGE ON DQN |
|---|---|---|
| 0 | $V_{OH}$ | $V_{OL}$ |
| 1 | $V_{OH}$ | $V_{OL}$ |
| 2 | $V_{OH}$ | $V_{OH}$ |
| 3 | $V_{OH}$ | $V_{OH}$ |
| 4 | $V_{OH}$ | $V_{OH}$ |
| 5 | $V_{OH}$ | $V_{OH}$ |
| 6 | $V_{OH}$ | $V_{OL}$ |
| 7 | $V_{OH}$ | $V_{OL}$ |

Table 1. Voltages on Signals DQP and DQN of FIG. 7

The information signaling received at a receiver 415 for the voltage levels of the graph 700 (and Table 1) can represent, for example, the following eight logical value pairs (DQP DQN): 10, 10, 11, 11, 11, 11, 10, and 10. Because of the non-differential, single-ended signaling during bit times 2, 3, 4, and 5, the information is not recovered as data information. The information is recovered as control information that corresponds to a "11" data pattern. The bandwidth of the control information recovery hardware, such as the two pseudo-differential receivers 625 and 630 as well as the control block 635, may be reduced because the "11" data pattern is repeated for multiple bit times. As an (un-illustrated) alternative, the eight logical value pairs may be: 01, 11, 11, 11, 11, 11, 11, and 01, which provides for a six-bit-length unit of time for the control information recovery. Also, the eight logical value pairs may be: 10, 10, 00, 00, 00, 00, 10, and 10. Other logical value pairs may alternatively be employed.

Thus, the graph 700 may be considered to represent a lowered/reduced control information speed/rate. In this situation, the information recovery logic 520 (of FIG. 5) of the receiver 415 has four bit times to correctly interpret the control information on the two lines 410P and 410N. The bandwidth of the control-related components of the information recovery logic 520 may therefore be lower than the bandwidth of the data-related components, which results in the control-related components being less reactive to noise This lowered/reduced control information speed/rate is especially usable with, for example, commands that only or primarily apply to an entire byte of data information, such as mask byte commands. This reduced control information rate is also especially applicable to general commands that are not timing critical and/or that are not related to any particular byte of data information.

However, the graph 700 may also be considered to represent a high control information speed/rate. With a higher transmission rate of control and/or data information, each bit time may represent a different item of information. Hence, bit times 0, 1, 6, and 7 may each represent individual items of information of a first type (such as data information), and bit times 2, 3, 4, and 5 may each represent individual items of information of a second type (such as control information). In the exemplary implementation 600 of FIG. 6, control information from the control input 510C may be transmitted during a first bit time while data information from the data input 510D may be transmitted during a second, immediately succeeding bit time, or vice versa. The switching may be accomplished by only providing valid information to the desired input, by using a select instruction/input (not explicitly shown in FIG. 6), and so forth.

Figure 8:
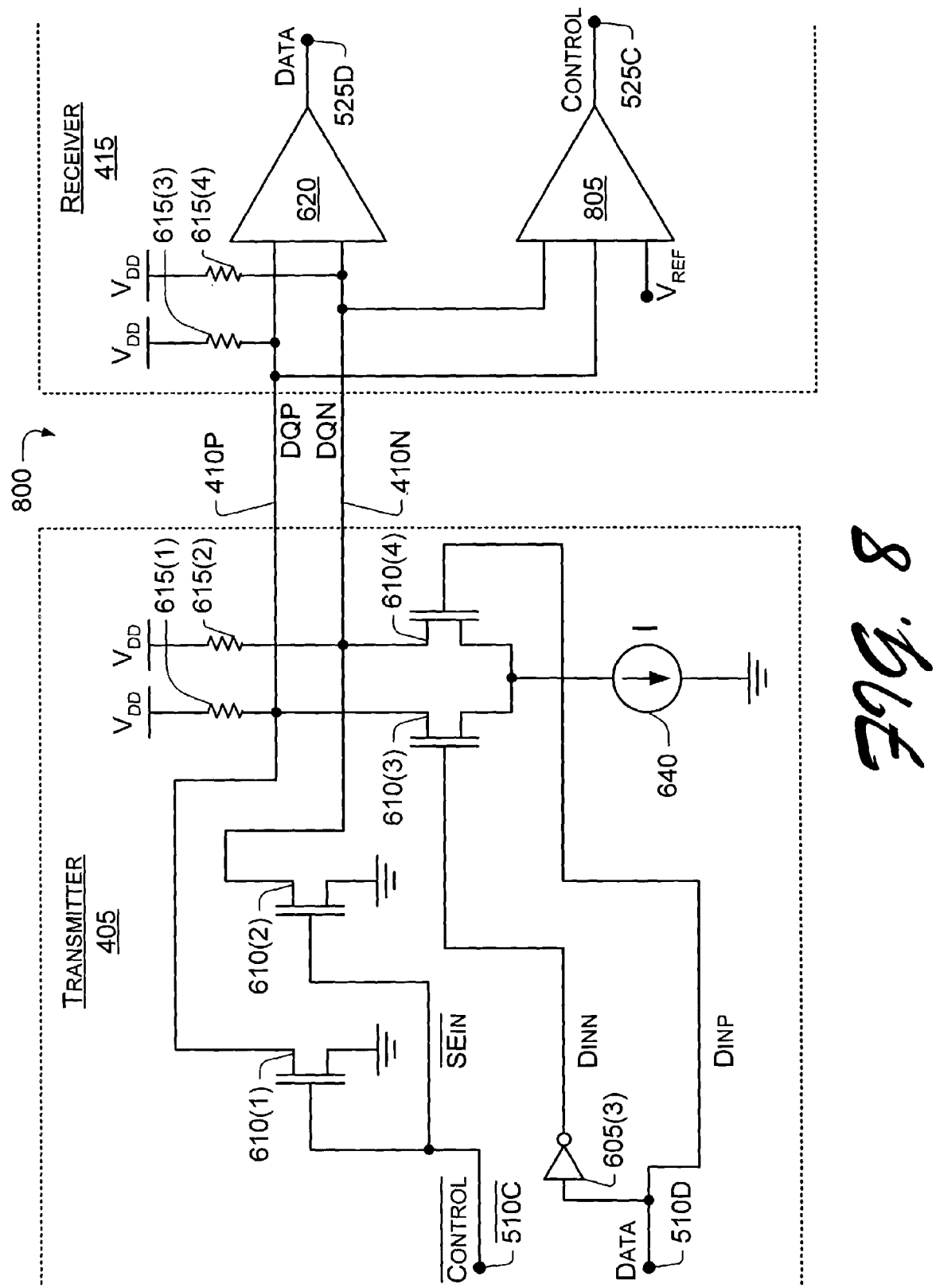
FIG. 8 is a schematic view of another exemplary implementation of a transmitter and a receiver that are capable of communicating data information and control information using differential signaling and single-ended signaling.

FIG. 8 is a schematic view of an exemplary implementation 800 of a transmitter 405 and a receiver 415 that are capable of communicating data information and control information using differential signaling and single-ended signaling across a bus 410. The exemplary implementation 800 differs from the exemplary implementation 600 (of FIG. 6) in a number of manners. Firstly, the control information is provided in an inverted form to the control_bar input 510C_bar. The $SE_{IN}$_bar for the control information thus enables the inverters 605(1) and 605(2) to be omitted from the transmitter 405 of the implementation 800.

Secondly, in the exemplary implementation 800, the control-related component of the information recovery logic 520 comprises a two-input pseudo-differential receiver 805. The two-input pseudo-differential receiver 805 accepts as input the voltage values on the two lines 410P and 410N, as well as $V_{REF}$. The output of the two-input pseudo-differential receiver 805 is high if both of the two lines 410P and 410N are at a higher voltage than $V_{REF}$. Similarly, the output of the two-input pseudo-differential receiver 805 is low if both of the two differential lines 410P and 410N are at a lower voltage than $V_{REF}$. The output of the two-input pseudo-differential receiver 805 is forwarded as the recovered control information on the control output 525C. It should be noted that the differential receivers 625 and 630 and the control block 635 may be used in the exemplary implementation 800 in place of the two-input pseudo-differential receiver 805 and that, conversely, the two-input pseudo-differential receiver 805 may be used in the exemplary implementation 600 instead of the differential receivers 625 and 630 and the control block 635.

Although the invention has been described with reference to specific exemplary embodiments thereof, it will be evident that various modifications and changes may be made thereto without departing from the broader spirit and scope of the invention. Accordingly, the specification and drawings are to be regarded in an illustrative rather than a restrictive sense

The invention claimed is:

1. A system for communicating information, comprising:
at least two signal lines;
a transmitting unit connected to the at least two signal lines, the transmitting unit to accept information of a first type and to encode the information of the first type into a signal of a first type, the transmitting unit to accept information of a second type and to encode the information of the second type into a signal of a second type; and
a receiving unit connected to the at least two signal lines, the receiving unit to receive the signal of the first type and to decode the signal of the first type into the information of the first type, the receiving unit to receive the signal of the second type and to decode the signal of the second type into the information of the second type;
wherein a transmitter of the transmitting unit receives the information of the first type from at least one first input, the information of the second type from at least one second input, and a select instruction from at least one select input;
wherein the select instruction instructs the transmitter to select from one of the information of the first type from the at least one first input and the information of the second type from the at least one second input, and
wherein the signal of the first type comprises driving different voltages on the at least two signal lines, and the signal of the second type comprises driving approximately equal voltages on the at least two signal lines.

2. The system as recited in claim 1, wherein the information of the first type comprises data information, and the information of the second type comprises control information.

3. The system as recited in claim 1, wherein the system comprises a memory system.

4. The system as recited in claim 1, wherein the information of the second type comprises at least one command selected from the group comprising mask byte, refresh storage cells, power down, calibrate, and initialize at least one register.

5. The system as recited in claim 1, wherein the system comprises at least one of (i) a computer system, (ii) a memory card, (iii) at least one printed circuit board (PCB), and (iv) at least one component on a PCB.

6. The system as recited in claim 1, wherein a receiver of the receiving unit to forward the information of the first type on at least one first output and to forward the information of the second type on at least one second output.

7. The system as recited in claim 1, wherein the transmitter comprises an output driver.

8. The system as recited in claim 7, wherein the output driver comprises (i) a first pair of transistors that accept the information of the first type and produce the signal of the first type and (ii) a second pair of transistors that accept the information of the second type and produce the signal of the second type.

9. The system as recited in claim 8, wherein the output driver further comprises (i) one of more resistors, (ii) one or more inverters, and (iii) at least one current source.

10. The system as recited in claim 1, wherein the signal of the first type comprises differential signaling, and the signal of the second type comprises single-ended signaling.

11. The system as recited in claim 10, wherein the receiving unit to decode the differential signaling into the information of the first type by evaluating a logical value that depends on a difference between two voltage values on the at least two signal lines.

12. The system as recited in claim 1, wherein a receiver of the receiving unit comprises:
at least one component that is targeted to the information of the first type and to decode the signal of the first type into the information of the first type; and
at least one component that is targeted to the information of the second type and to decode the signal of the second type into the information of the second type.

13. The system as recited in claim 1, wherein an information recovery logic of the receiving unit comprises:
a differential receiver, the differential receiver connected to the at least two signal lines; the differential receiver to produce an output in response to the at least two signal lines having different voltages.

14. The system as recited in claim 13, wherein the output comprises the information of the first type.

15. The system as recited in claim 1, wherein an information recovery logic of the receiving unit comprises:
a two-input pseudo-differential receiver, the two-input pseudo-differential receiver connected to the at least two signal lines and a reference voltage; the two-input pseudo-differential receiver to produce an output in response to the at least two signal lines having approximately equal voltages and in response to the reference voltage.

16. The system as recited in claim 15, wherein the output comprises the information of the second type.

17. The system as recited in claim 1, wherein an information recovery logic of the receiving unit comprises:
a first pseudo-differential receiver, the first pseudo-differential receiver connected to a first line of the at least two signal lines and a reference voltage; the first pseudo-differential receiver to produce a first output in response to a first voltage on the first line and in response to the reference voltage;
a second pseudo-differential receiver, the second pseudo-differential receiver connected to a second line of the at least two signal lines and the reference voltage; the second pseudo-differential receiver to produce a second output in response to a second voltage on the second line and in response to the reference voltage; and
a control block, the control block to receive as a first input the first output and as a second input the second output; the control block to produce an output in response to the first input and the second input.

18. The system as recited in claim 17, wherein the output of the control block comprises the information of the second type.

19. The system as recited in claim 17, wherein the control block comprises at least one AND gate.

20. A system for communicating information over a multi-line bus, the system comprising:
a transmitting unit connected to the multi-line bus, the transmitting unit including a transmitter to transmit data signals over the multi-line bus using differential signaling and control signals over the multi-line bus using single-ended signaling; and
a receiving unit connected to the multi-line bus, the receiving unit including a receiver to receive data signals in a differential signaling format via the multi-line bus and control signals in a single-ended signaling format via the multi-line bus;
wherein the transmitter receives data values to transmit the data signals, control values to transmit control signals, and a select signal;
wherein the select signal instructs the transmitter to select from one of the data values and control values; and
wherein the data signals are transmitted by driving different voltages on the at least two signal lines, and the control signals are transmitted by driving approximately equal voltages on the at least two signal lines.

21. The system as recited in claim 20, wherein the receiver to interpret signals that are received in the differential signaling format as data information and to interpret signals that are received in the single-ended signaling format as control information.

22. The system as recited in claim 20, wherein the differential signaling format comprises differing voltages on the multi-line bus, and the single-ended signaling format comprises approximately equal voltages on the multi-line bus.

23. The system as recited in claim 20, wherein the transmitting unit comprises an integrated circuit, and the receiving unit comprises another integrated circuits.

24. The system as recited in claim 20, wherein at least the receiving unit includes a plurality of memory storage cells.

25. A system for communicating different types of information over a bus, the system comprising:
a transmitting unit that includes an output driver; the output driver connected to the bus, the output driver to transmit signals of a first type and signals of a second type over the bus; and
a receiving unit that includes an information recovery logic; the information recovery logic connected to the bus, the information recovery logic to receive the signals of the first type and the signals of the second type via the bus, the information recovery logic to interpret the signals of the first type as signals having a first information type and the signals of the second type as signals having a second information type;
wherein the output driver receives first information to transmit the first type of signals, second information to transmit the second type of signals, and a select instruction;
wherein the select instruction instructs the output driver to select from one of the first information and the second information; and
wherein the signal of the first type includes different voltages on at least two signal lines in the bus, and the signal of the second type includes approximately equal voltages on the at least two signal lines in the bus.

26. The system as recited in claim 25, wherein the receiving unit comprises at least one memory storage module, and the transmitting unit comprises a memory controller module.

27. The system as recited in claim 25, wherein the information recovery logic includes at least one component to interpret the signals of the first type and at least one different component to interpret the signals of the second type.

28. The system as recited in claim 27, wherein the at least one component forwards data information, and the at least one different component forwards control information.

29. The system as recited in claim 25, wherein the signals having the second information type comprise at least one command selected from the group comprising mask byte, refresh storage cells, power down, calibrate, and initialize at least one register.

30. A system to communicate over at least two lines, the system comprising:
a first line;
a second line;
a transmitting unit electrically coupled to the first line and to the second line, the transmitting unit to produce at least one signal of a first information type by driving the first line and the second line to differing voltages, the transmitting unit to produce at least one signal of a second information type by driving both the first line and the second line to approximately equal voltages; and
a receiving unit electrically coupled to the first line and to the second line, the receiving unit to decode the differing voltages on the first line and the second line as at least one signal of the first information type, the receiving unit to decode the approximately equal voltages on the first line and the second line as at least one signal of the second information type;
wherein the transmitting unit receives first information to produce at least one signal of a first information type, second information to produce at least one signal of a second information time, and a select instruction; and
wherein the select instruction instructs the transmitting unit to select from one of the first information and the second information.

31. The system as recited in claim 30, wherein the system comprises a memory system.

32. The system as recited in claim 30, wherein the differing voltages comprise a first voltage of approximately 1.2 volts and a second voltage of approximately 1.0 volt.

33. The system as recited in claim 30, wherein the approximately equal voltages comprise a first voltage and a second voltage; and wherein a difference between the first voltage and the second voltage is less than or equal to twenty milli-volts (20 mV).

34. The system as recited in claim 30, wherein the transmitting unit comprises a first integrated circuit chip, and the receiving unit comprises a second integrated circuit chip; and wherein the first line and the second line comprise a bus between the transmitting unit and the receiving unit.

35. A system to communicate data information and control information using a bus, the system comprising:
a transmitter coupled to the bus, the transmitter having at least one data input and at least one control input, the transmitter to provide to the bus data information from the at least one data input and control information from the at least one control input; and
a receiver coupled to the bus, the receiver having at least one data output and at least one control output, the receiver to extract from the bus data information for the at least one data output and control information for the at least one control output in response to signaling type;
wherein the data information is communicated over the bus using signals of a first type, and the control information is communicated over the bus using signals of a second type;
wherein a transmitter receives first information from the at least one data input, second information from the at least one control input, and a select instruction;
wherein the select instruction instructs the transmitter to select from one of the first information from the at least one data input and the second information from the at least one control input; and
wherein the signals of the first type comprise differing voltages on the bus, and the signals of the second type comprise approximately equal voltages on the bus.

36. The system as recited in claim 35, wherein the signals of the first type are communicated over the bus at a higher frequency than the signals of the second type are communicated over the bus.

37. The system as recited in claim 35, wherein at least eight items of data information are communicated over the bus during a predetermined length of time while one item of control information is communicated over the bus during the predetermined length of time.

38. The system as recited in claim 35, wherein the system comprises a computer system.

39. The system as recited in claim 35, further comprising:
an array of memory cells;
wherein the receiver and the array of memory cells are located on the same integrated circuit chip.

40. The system as recited in claim 35, wherein the signals of the first type comprise differential signaling, and the signals of the second type comprise single-ended signaling.

41. A memory system to communicate information over a multi-line bus, the memory system comprising:
a plurality of memory storage cells;
a receiving unit, the receiving unit to interpret signaling of a first type as information of a first type; and
a transmitting unit in communication with the receiving unit via the multi-line bus, the transmitting unit to transmit the information of the first type using the signaling of the first type, the transmitting unit to transmit information of a second type using signaling of a second type;
wherein the receiving unit to interpret the signaling of the second type as the information of the second type;
wherein the transmitting unit receives first information to transmit information of the first type, second information to transmit information of the second type, and a select instruction,
wherein the select instruction instructs the transmitting unit to select from one of the first information and the second information; and
wherein the signaling of the first type comprises two voltages that differ from each other, and the signaling of the second type comprises two voltages that are approximately equal.

42. The memory system as recited in claim 41, wherein the receiving unit comprises at least one memory storage module, and the transmitting unit comprises a memory controller module.

43. The memory system as recited in claim 41, wherein the information of the first type comprises data information, and the information of the second type comprises control information.

44. The memory system as recited in claim 41, wherein at least a portion of the plurality of memory storage cells are located at the receiving unit.

45. The memory system as recited in claim 41, wherein the signaling of the first type comprises differential signaling, and the signaling of the second type comprises single-ended signaling.

46. The memory system as recited in claim 41, wherein the information of the first type comprises memory write data, and the information of the second type comprises one or more memory control commands.

47. The memory system as recited in claim 41, wherein the information of the first type comprises memory write data, and the information of the second type comprises one or more memory control commands selected from the group comprising mask byte, refresh storage cells, power down, calibrate, and initialize registers.

48. A method for communicating information over a multi-line bus, the method comprising:
sending, from a transmitting unit over the multi-line bus, information of a first type using signaling of a first type;
interpreting, at a receiving unit, the signaling of the first type as the information of the first type;
sending, from the transmitting unit over the multi-line bus, information of a second type using signaling of a second type;
instructing the transmitting unit to select from one of the information of the first type and the information of the second type; and
interpreting, at the receiving unit, the signaling of the second type as the information of the second type;
wherein the sending information of a first type using signaling of a first type comprises driving different voltages on different lines of the multi-line bus; and
wherein sending information of a second type using signaling of a second type comprises driving approximately equal voltages on the different lines of the multi-line bus.

49. The method as recited in claim 48, further comprising:
performing, at the receiving unit, a command in response to the information of the second type that is sent using the signaling of the second type.

50. The method as recited in claim 48, further comprising:
performing, at the receiving unit, a memory-related command responsive to the information of the second type that is sent using the signaling of the second type.

51. The method as recited in claim 48, wherein the information of the first type comprises data information, and the information of the second type comprises control information.

52. The method as recited in claim 48, wherein the signaling of the first type comprises differential signaling, and the signaling of the second type comprises single-ended signaling.

53. A method for communicating information over a bus having two or more lines, the method comprising:
sending a first information type at a first speed over the bus;
receiving the first information type at the first speed via the bus;
sending a second information type at a second speed over the bus;
selecting from one of first information used in sending the first information type and second information used in sending the second information type; and
receiving the second information type at the second speed via the bus;
wherein the first speed is greater than the second speed;
wherein the sending the first information type comprises driving different voltages on different lines of the bus; and
wherein sending second information comprises driving approximately equal voltages on the different lines of the bus.

54. The method as recited in claim 53, wherein the first information type comprises data information, and the second information type comprises control information.

55. The method as recited in claim 53, wherein the sending the first and second information type comprises sending from a memory controller module, and the receiving the first and second information type comprises receiving at one or more memory storage modules.

56. The method as recited in claim 53, wherein the first speed is at least eight (8) times greater than the second speed.

57. The method as recited in claim 53, wherein during a unit of time of a predetermined length, the sending the first information type is performed at least eight (8) times, and the sending the second information type is performed one (1) time.

58. A system to communicate information over a multi-line bus, the system comprising:
a transmitting unit, the transmitting unit to transmit a first information type over the multi-line bus at a first speed, and the transmitting unit to transmit a second information type over the multi-line bus at a second speed; and
a receiving unit in communication with the transmitting unit via the multi-line bus, the receiving unit to receive the first information type via the multi-line bus at the first speed, and the receiving unit to receive the second information type via the multi-line bus at the second speed;
wherein the transmitting unit receives first information to transmit information of the first information type, second information to transmit information of the second information type, and a select instruction;
wherein the select instruction instructs the transmitting unit to select from one of the first information and the second information;
wherein the first information type includes two voltages that differ from each other, and the second information type includes two voltages that are approximately equal; and
wherein the first speed is greater than the second speed.

59. The system as recited in claim 58, wherein the second information type comprises at least one command selected from the group comprising mask byte, refresh storage cells, power down, calibrate, and initialize registers.

60. The system as recited in claim 58, wherein the second information type comprises control information, and the first information type comprises data information.

61. The system as recited in claim 58, wherein the receiving unit to interpret signals received at the first speed as the first information type, and the receiving unit to interpret signals received at the second speed as the second information type.

62. An arrangement to communicate information of different types, the arrangement comprising:
means for propagating signals;
means for transmitting information of a first type using differential signals and information of a second type using single-ended signals over the means for propagating signals;
means for selecting from one of the first information used to transmit information of a first type and the information used to transmit information of a second type;
means for receiving the differential signals via the means for propagating signals and for forwarding the information of the first type; and
means for receiving the single-ended signals via the means for propagating signals and for forwarding the information of the second type;
wherein the differential signals are represented by two voltages that differ from each other, and the single-ended signals are represented by two voltages that are approximately equal.

63. The arrangement as recited in claim 62, wherein the information of the first type comprises data information, and the information of the second type comprises control information.

64. An arrangement for communicating using different signaling types, the arrangement comprising:
means for propagating at least two sub-signals;
means for transmitting connected to the means for propagating, the means for transmitting including means for driving sub-signals; the means for driving sub-signals to receive information of a first type and to drive different voltages onto the means for propagating to represent the information of the first type, the means for driving sub-signals to receive information of a second type and to drive approximately equal voltages onto the means for propagating to represent the information of the second type;
means for receiving connected to the means for propagating, the means for receiving including means for recovering information; the means for recovering information to receive the voltages from the means for propagating, the means for recovering information to decode the different voltages into the information of the first type and to decode the approximately equal voltages into the information of the second type; and
means for selecting from one of the information of a first type and the information of a second type.

65. The arrangement as recited in claim 64, wherein the means for driving sub-signals comprises:
means for driving the information of the first type using the different voltages; and
means for driving the information of the second type using the approximately equal voltages.

66. The arrangement as recited in claim 64, wherein the means for recovering information comprises:
- means for decoding the different voltages into the information of the first type; and
- means for decoding the approximately equal voltages into the information of the second type.

67. An integrated circuit to transmit different types of information using a multi-line bus, the integrated circuit comprising:
- at least an output interface, the at least an output interface to interface with a multi-line bus; and
- a transmitter coupled to the at least an output interface, the transmitter having at least one first information type input and at least one second information type input, the transmitter to provide to the at least an output interface information of a first type from the at least one first information type input and information of a second type from the at least one second information type input;
- wherein the information of the first type is provided to the at least an output interface using a first signaling format, and the information of the second type is provided to the at least an output interface using a second signaling format;
- wherein the transmitter receives the at least one first information type input, the at least one second information type input, and a select instruction;
- wherein the select instruction instructs the transmitter to select from one of the at least one first information type input and the at least one second information type input; and
- wherein the first signaling format includes two voltages that differ from each other, and the second signaling format includes two voltages that are approximately equal.

68. The integrated circuit as recited in claim 67, wherein the information of the first type comprises data information, and the information of the second type comprises control information; and wherein the first signaling format comprises a differential signaling format, and the second signaling format comprises a single-ended signaling format.

69. A memory system, comprising:
- a plurality of memory storage cells;
- a bus having two or more lines;
- a transmitter coupled to the bus, the transmitter to produce a data signal by driving two different voltages on the bus, the transmitter to produce a control signal by driving two approximately equal voltages on the bus; and
- a receiver coupled to the bus, the receiver to decode the two different voltages on the bus as the data signal, the receiver to decode the two approximately equal voltages on the bus as the control signal;
- wherein the transmitter receives first information used to produce a data signal, second information to produce a control signal and a select instruction; and
- wherein the select instruction instructs the transmitter to select from one of the first information and the second information.

70. The memory system as recited in claim 69, wherein the plurality of memory storage cells comprise a memory storage array; and wherein the memory storage array and the receiver comprise a memory storage module.

71. The memory system as recited in claim 69, wherein the plurality of memory storage cells comprise a buffer; and wherein the buffer and the transmitter comprise a memory controller module.

72. The memory system as recited in claim 69, wherein the two approximately equal voltages are equal.

73. The memory system as recited in claim 69, wherein the control signal comprises a mask byte command.

74. A method for communicating using differential and single-ended signaling, comprising:
- encoding information of a first type into differential signaling;
- transmitting the differential signaling over a multi-line bus;
- receiving the differential signaling via the multi-line bus;
- decoding the differential signaling to recover the information of the first type;
- encoding information of a second type into single-ended signaling;
- transmitting the single-ended signaling over the multi-line bus;
- receiving the single-ended signaling via the multi-line bus;
- decoding the single-ended signaling to recover the information of the second type; and
- selecting from one of information of the first type and information of the second type;
- wherein the differential signaling includes two voltages that differ from each other, and single-ended signaling includes two voltages that are approximately equal.

75. The method as recited in claim 74, further comprising:
- performing an operation in response to the information of the second type that is recovered from the single-ended signaling.

76. The method as recited in claim 75, wherein the operation comprises at least one operation selected from the group comprising mask byte, refresh storage cells, power down, calibrate, and initialize at least one register.

77. The method as recited in claim 74, wherein the information of the first type comprises at least eight bits of data, and the information of the second type comprises one command.

78. The method as recited in claim 74, wherein the information of the first type comprises at least eight bits of data, and the information of the second type comprises two or more commands.

79. The method as recited in claim 74, wherein the decoding the single-ended signaling to recover the information of the second type is performed three times in order to determine a single command.

\* \* \* \* \*